Patented June 5, 1934

UNITED STATES PATENT OFFICE 1,961,268

METHOD OF TREATING CELLULOSE

Julius Voss, Wiesbaden-Biebrich, Germany, assignor to Du Pont Cellophane Company, New York, N. Y., a corporation of Delaware No Drawing. Application January 29, 1931, Serial No. 512,225. In Germany January 31, 1930

7 Claims. (Cl. 18—57)

This invention relates to improvements in methods of preparing regenerated cellulose products and to the improved products prepared thereby.

Films or membranes of regenerated cellulose are produced by casting, drawing, or spinning cellulose derivatives (such as cellulose xanthate, or cuprammonium cellulose) which are regenerated in the casting or spinning operation. These materials are then purified by passing them through suitable purifying solutions and are thereafter dried. During the passage through the various solutions and particularly during drying, strains are set up which cause the material to stretch or even to tear occasionally, in the machine direction, and to swell to different degrees in different directions when wet.

It is an object of this invention to improve the process of manufacturing regenerated cellulose materials, to eliminate the former defects, and to produce an improved products.

The objects of this invention are accomplished by treating the films of regenerated cellulose before or after drying with solutions of substances having a swelling action on the cellulose, thereafter washing out the swelling agent, and drying. Among the swelling agents having this effect are caustic alkalies such as caustic soda, salts such as calcium- or lithium thiocyanate, and zinc chloride, in water-, aqueous alcohol-, or salt solution. In order to effect a substantially complete release of the strains in the regenerated cellulose material the process is preferably carried out under conditions which impose no strain whatever on the regenerated cellulose.

In using caustic potash or caustic soda solutions, low temperatures are preferable, but with solutions of calcium thiocyanate, and zinc chloride, considerably higher temperatures are satisfactory.

When the swelling agent is washed out of the film, the film shrinks. This shrinkage is dependent to a considerable extent upon the concentration of the swelling agent, is greater in the machine direction than in the transverse direction, and results in considerably increasing the thickness of the film.

After the treatment with the swelling agent, the cellulose may be treated with glycerine (or other softening agents), and thereafter dried, or the glycerine treatment may be omitted.

The following examples illustrate the invention:—

Example I

A seamless hose of regenerated cellulose produced in the usual way is placed for 10 minutes in 8% caustic soda solution at 20° C., is washed, immersed in a 7% glycerine solution, and is dried without tension. The hose which originally was 15 cm. long, shrank on washing to 13.5 cm. and on drying to 12.2 cm. The width, which was originally 71 mm., shrank on washing with water after the treatment with caustic solution to 68.5 mm. and on drying to 57.5 mm. The original thickness of the hose, of 0.05 mm., increases to 0.066 mm. after being dried without tension. This treatment considerably reduces the swelling capacity of the hose in thickness. The hose, which before treatment with caustic solution swelled 130% in thickness, on being placed in water, after the treatment swelled only 66%.

Example II

A cellulose film is placed in 6% caustic soda solution at 20° C., is then washed, impregnated with 7% glycerine, and dried without tension. This changes the film from a length of 200 mm. and a width of 100 mm. in the dry state to 184 mm. length and 109 mm. width after treatment with caustic soda solution and washing. After impregnation with glycerine and drying it shrinks to 167 and 86.5 mm. respectively. On being placed in water after the treatment the film swells in thickness only 60%, in comparison to a previous swelling of 120%.

Among the advantages of the invention are the production having cellulose materials of superior strength, comparatively low water content, and absorbability and which are much less subject to alterations in length and thickness than prior art compositions.

As many apparently widely different embodiments of this invention may be made without departing from the spirit and scope thereof, it is to be understood that I do not limit myself to the specific embodiments thereof except as defined in the appended claims.

I claim:

1. In treating cellulose regenerated from viscose in sheet form which has been prevented from shrinking fully, the steps which comprise treating the cellulose with a swelling agent and removing the swelling agent.

2. The method of treating cellulose regenerated from viscose in sheet form which is not fully shrunk comprising treating the cellulose with a swelling agent, removing the swelling agent, and treating the cellulose with a softening agent.

3. In the treatment of cellulose regenerated from viscose, which is not fully shrunk, the steps which include treating cellulose with a swelling agent, washing, treating with a softening agent, and drying.

4. The method of treating cellulose regenerated from viscose in sheet form which was manufactured under tension which comprises treating the cellulose with a caustic alkali solution, washing free of caustic alkali, treating the cellulose with glycerin, and drying.

5. The method of treating cellulose regenerated from viscose in sheet form, which has not fully shrunk, which comprises treating the cellulose with calcium thiocyanate, washing, treating with a softening agent, and drying.

6. The method of treating cellulose regenerated from viscose in sheet form, which has not fully shrunk, which comprises treating the cellulose with zinc chloride, washing, treating with a softening agent, and drying.

7. The method of treating cellulose regenerated from viscose in sheet form which has not fully shrunk, which comprises treating the cellulose with a caustic alkali, washing, treating with a softening agent, and drying.

JULIUS VOSS.